United States Patent
Durham et al.

(10) Patent No.: US 11,636,049 B2
(45) Date of Patent: Apr. 25, 2023

(54) MEMORY PROTECTION WITH HIDDEN INLINE METADATA

(71) Applicant: Intel Corporation, Santa Clara, CA (US)

(72) Inventors: David M. Durham, Beaverton, OR (US); Ron Gabor, Herzliya (IL)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 17/705,857

(22) Filed: Mar. 28, 2022

(65) Prior Publication Data

US 2022/0222186 A1   Jul. 14, 2022

Related U.S. Application Data

(63) Continuation of application No. 16/369,880, filed on Mar. 29, 2019, now Pat. No. 11,288,213.

(51) Int. Cl.
| | |
|---|---|
| *G06F 21/00* | (2013.01) |
| *G06F 12/14* | (2006.01) |
| *G06F 21/60* | (2013.01) |
| *G06F 21/62* | (2013.01) |
| *G06F 21/57* | (2013.01) |

(52) U.S. Cl.
CPC ........ *G06F 12/1458* (2013.01); *G06F 21/577* (2013.01); *G06F 21/602* (2013.01); *G06F 21/6218* (2013.01); *G06F 2212/1052* (2013.01); *G06F 2212/608* (2013.01); *G06F 2221/034* (2013.01)

(58) Field of Classification Search
None
See application file for complete search history.

(56) References Cited

U.S. PATENT DOCUMENTS

2008/0022065 A1   1/2008   Gutti et al.
2012/0079174 A1*  3/2012   Nellans ............... G06F 13/1694
                                               711/E12.008

(Continued)

FOREIGN PATENT DOCUMENTS

| CN | 111753336 A | 10/2020 |
| EP | 3716081 A1 | 9/2020 |

OTHER PUBLICATIONS

Gaur, Jayesh et al. Near-Optimal Access Partitioning for Memory Hierarchies with Multiple Heterogeneous Bandwidth Sources. 2017 IEEE International Symposium on High Performance Computer Architecture (HPCA). https://ieeexplore.ieee.org/stamp/stamp.jsp?tp=&arnumber=7920810 (Year: 2017).*

(Continued)

*Primary Examiner* — Jeremiah L Avery
(74) *Attorney, Agent, or Firm* — Jaffery Watson Mendonsa & Hamilton LLP

(57) ABSTRACT

Embodiments are directed to memory protection with hidden inline metadata. An embodiment of an apparatus includes processor cores; a computer memory for the storage of data; and cache memory communicatively coupled with one or more of the processor cores, wherein one or more processor cores of the plurality of processor cores are to implant hidden inline metadata in one or more cachelines for the cache memory, the hidden inline metadata being hidden at a linear address level.

20 Claims, 10 Drawing Sheets

(56) References Cited

U.S. PATENT DOCUMENTS

| | | | |
|---|---|---|---|
| 2014/0281131 A1* | 9/2014 | Joshi | G06F 12/0804 |
| | | | 711/133 |
| 2015/0089173 A1* | 3/2015 | Chhabra | G06F 12/1408 |
| | | | 711/163 |
| 2016/0371496 A1* | 12/2016 | Sell | G06F 21/604 |
| 2017/0285976 A1* | 10/2017 | Durham | G06F 21/64 |
| 2018/0091308 A1 | 3/2018 | Durham et al. | |
| 2019/0042359 A1 | 2/2019 | Durham | |
| 2019/0042799 A1 | 2/2019 | Durham et al. | |
| 2020/0004953 A1 | 1/2020 | LeMay et al. | |

OTHER PUBLICATIONS

Williams, John R. et al. Large in-memory cyber-physical security-related analytics via scalable coherent shared memory architectures. 2011 IEEE Symposium on Computational Intelligence in Cyber Security (CICS). https://ieeexplore.ieee.org/stamp/stamp.jsp?tp=&arnumber=5949414 (Year: 2011).*

Bradberry, Alex, et al., "Tagged memory and minion cores in the iowRISC SoC", Dec. 2014, IowRISC, Open to the Core, iowRiSC-MEMO 2014-001, 9 pages.

Brown, Jeremy, et al., "A capability representation with embedded address and nearly-exact object bounds", (2000) Project Aries Technical Memo ARIES-TM-005, Artificial Intelligence Laboratory, Department of Electrical Engineering and Computer Science Massachusetts Institute of Technology, V-005, 8 pages.

Carter, N.P , et al., "Hardware Support for Fast Capability-based Addressing", Appears in tile Proceedings of the 6th International Conference on Architectural Support for Programming Lan?iuages and Operating Systems (ASPLOS Vi). Artificial Intelligence Laboratory, Laboratory for Computer Science, Massachusetts Institute of Technology. Pages 1-9.

Clark, B.E., "Application System/400 performance characteristics",, Clark and Corrigan, IBM Systems Journal, vol. 28., No. 3, 1989. pp. 407-423.

Communication Pursuant to Article 94(3) EPC in EP Application No. 20 154 802.1-1209, dated Jan. 24, 2022, 7 pages.

Davis, Brooks, et al., "CheriABi: Enforcing Valid Pointer Provenance and Minimizing Pointer Privilege in the POSIX C Run-time Environment" (2019) ACM ISBN 978-1-4503-6240-5i19/04. 15 pages.

Dorier, Matthieu et al. Using Formal Grammars to Predict 1/0 Behaviors in HPC: The Omnisc'IO Approach. IEEE Transactions on Parallel and Distributed Systems, vol. 27, Issue: 8. https://ieeexplore.ieee.org/stamp/stamp.jsp?tp=&arnumber=7289462 (Year: 2016).

Evans, Isaac, et al., "Missing the Point(er): On the Effectiveness of Code Pointer Integrity", MIT CSAIL, Cambridge MA, 16 pages.

Extended European Search Report for EP Application No. 20154802.1 dated Aug. 11, 2020. 11 pages.

Fleming, Shane T.; Thomas, David B. Using Runahead Execution to Hide Memory Latency in High Level Synthesis. 2017 IEEE 25th Annual International Symposium on Field-Programmable Custom Computing Machines (FCCM). https://ieeexplore.ieee.org/ stamp/stamp.jsp?tp=&arnumber=7966661 (Year: 2017).

Fung, Wilson W. L. et al. Hardware transactional memory for GPU architectures. 2011 44th Annual IEEE/ACM International Symposium on Microarchitecture (MICRO). https://ieeexplore.ieee.org/stamp/stamp.jsp?tp=&arnumber=7851480 (Year: 2011).

Gregory J. Duck, et al., "An Extended Low Fat Allocator API and Applications", ARXIV.org., Cornell University Library, 2017 Olin Library Cornell University Ithaca, NY 14853, Apr. 13, 2018, XP080870455, pp. 1-12.

Hu, Hong, et al., "Data-Oreinted Programming On the Expressiveness of Non-Control Data Attacks", Department of Computer Science, National University of Singapore, 18 pages.

Joannou, Alexandre, et aL, "Efficient Tagged Memory", 2017 IEEE 35th International Conference on Computer Design, www.cl.cam.ac.uk.research/comparcl1, SRI International, Menlo Park, CA, 8 pages.

Kuznetsov, Volodymyr, et aL, "Code-Pointer Integrity", Appears in Proceedings of the 11th USENIX Symposium on Operating Systems Design and Implementation (OSDI), Oct. 2014, 17 pages.

Kwon, Albert, et al., "Low-Fat Pointers: Compact Encoding and Efficient Gate-Level Implementation of Fat Pointers for Spatial Safety and Capability-based Security", CCS'13, Nov. 4-8, 2013, Berlin, Germany, ACM 978-1 -4503-2477—Sep. 13, 11, 12 pages.

Oleksenko, Oleksii, et al., "Efficient Fault Tolerance using Intel MPX and TSX", Technische Universit at Drnsden, Germany and University of Neuc:h'atel, SwitzerlancL 2 pages.

Oleksii Oleksenko, et al., "Intel MPX Explained", Proceedings of the ACM on Measurement and Analysis of Computing Systems, ACM, 2 PEnn Plaza, Suite 701, New York, NY 10121, vol. 2, No. 2, Jun. 13, 2018, pp. 1-30, XP058410369.

Piromsopa, Krek, et al., "Secure BIT: Transparent, Hardware Buffer-Overflow Protection", IEEE Transactions on Dependable and Secure Computing Nov. 2006. DOI: 10.1109/TDSC.2006.56. 42 pages.

Serebryany, Konstantin, et al., "AddressSanitizer: A Fast Address Sanity Checker", Google, 10 pages.

Woodruff, Jonathan, et al., "The CHERI capability model Revisiting RISC in an age of risk" (2014) 978-1-4799-4394-4/14/ (C) 2014 IEEE. 12 pages.

* cited by examiner

MEMORY PROTECTION WITH HIDDEN INLINE METADATA

CLAIM OF PRIORITY

This Application is a continuation of and claims the benefit of and priority to U.S. application Ser. No. 16/369,880, entitled MEMORY PROTECTION WITH HIDDEN INLINE METADATA, by David M. Durham, et al., filed Mar. 29, 2019, now U.S. Pat. No. 11,288,213 with an issue date of Mar. 29, 2022, the entire contents of which are incorporated herein by reference.

TECHNICAL FIELD

Embodiments described herein generally relate to the field of electronic devices and, more particularly, memory protection with hidden inline metadata.

BACKGROUND

"Spectre" induces a system to speculatively perform operations that would not occur during correct program execution and which leak private, confidential, and/or secret information. "Meltdown" breaks all of the assumptions inherent in address space isolation and exploits out-of-order execution to read arbitrary kernel memory locations that may include private, confidential, and/or secret information. Both Spectre and Meltdown communicate the illicitly obtained private, confidential, and/or secret information to an adversary via a side-channel. Operating system (OS) and central processing unit (CPU) microcode patch-based mitigations for speculative execution based vulnerabilities such as Spectre and Meltdown can be improved by making the CPU aware of a program's intent by labeling the program data with metadata so that the hardware can operate on the data with full knowledge of its bounds, type, current assignment, etc.

Existing and potential hardware and software architectures manifest additional security vulnerabilities. For example, some architectures may be susceptible to memory pointers being overwritten. As another example, some architectures may be susceptible to memory pointers manipulation (value added) that cause the pointers to land on a wrong (unauthorized) data object, either in space or in time. As another example, some architectures may be limited in the granularity for which they provide protection. What is needed is a technical solution to these security vulnerabilities by allowing the hardware to know the software's intent.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
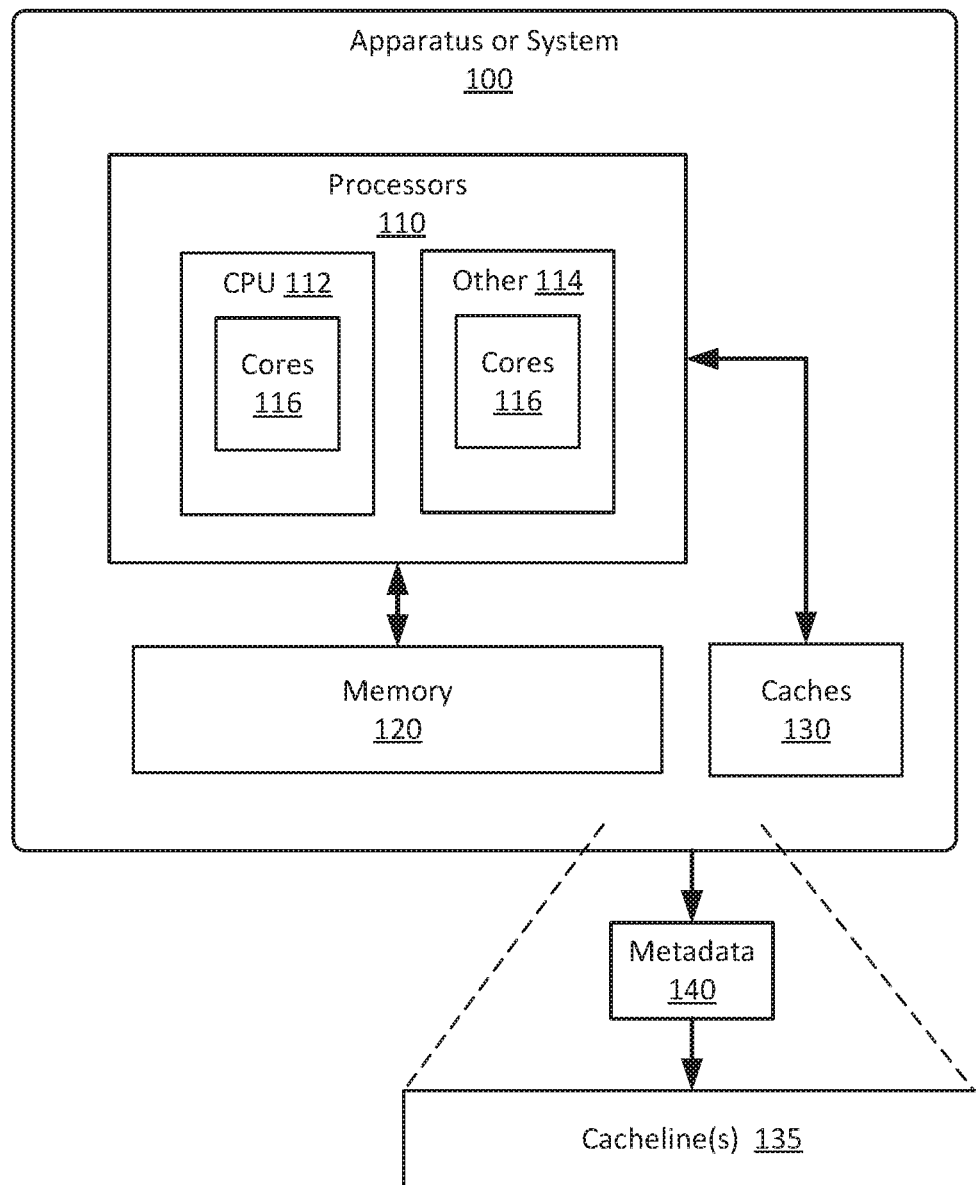
FIG. 1 is an illustration of insertion of metadata into a cacheline, in accordance with at least one embodiment described herein.

Embodiments described herein are directed to memory protection with hidden inline metadata.

Described herein are systems and methods for using memory tagging for side-channel defense, memory safety, and sandboxing to reduce the likelihood of successful side-channel attacks and other exploits, in accordance with various embodiments. The disclosed system and methods include memory tagging circuitry that is configured to address existing and potential hardware and software architectures security vulnerabilities, according to various embodiments. The memory tagging circuitry may be configured to prevent memory pointers being overwritten, prevent memory pointer manipulation (e.g., by adding values) that cause the pointers to land on a wrong (unauthorized) data object in memory space, access a non-current object in time and increase the granularity of memory tagging to include byte-level tagging in cache. The memory tagging circuitry may also be configured to sandbox untrusted code by tagging portions (e.g., words) of memory to indicate when the tagged portions of memory include contain a protected pointer. By co-locating metadata with the same cacheline as its associated data so that it is immediately available for enforcement, memory tagging circuitry provides security features while enabling CPUs to continue using and benefiting from performing speculative operations in a cache coherent manner. By allowing the hardware to automatically hide the metadata on the same cacheline transparently from software, legacy compatibility can be maintained as software may access virtual/linear memory contiguously without needing to ignore or skip over metadata regions, while the hardware may still enforce the metadata policies on the data.

In some embodiments, an apparatus, system, or method provides for memory protection with hidden inline metadata. The hidden inline metadata is implanted within one or more cachelines for a cache. The metadata is hidden at the linear address/virtual address level as memory is seen by software in a contiguous manner, but the metadata is available for the purposes of memory tagging (such as tag compare with a pointer tag value in a linear address), capabilities (such as data structure length, permissions), and/or fine grain memory access control as enforced by the hardware.

In some embodiments, hidden inline metadata may include, but is not limited to, tag storage. In some embodiments, an apparatus, system, or process may operate without defining tag storage architecturally. Hardware is to hide tag metadata, with an identifier to indicate whether metadata is present in a cacheline. In one embodiment a bit (or bits) in a page table entry identifies whether or not a cacheline includes hidden inline metadata.

The use of the hidden inline metadata may provide multiple advantages in the operation of an apparatus, system, or process in comparison with conventional technology to provide metadata, including:

Improved performance with a single cycle required access to data and hidden inline metadata;

Cache efficiency, with no additional metadata being required in the cache area;

Memory efficiency with metadata only being included when required;

Precision with both load and store checks being provided; and

Side channel protection with the parallel metadata being present to avoid speculation in data attacks.

An uncore (uncore referring to functions of a microprocessor that are not within a processor core) memory tagging solution can support sub-cacheline memory tagging and shifting data within multiple split cachelines to detect data buffer overflow, use after free, stack overflow, heap separation, access control, etc. DCD (Data Corruption Detection) provides a core memory tagging solution using table lookups from linear space. However, in uncore memory tagging there may be issues regarding precision (regarding a time required to detect/report errors) and ability to detect both underflow and overflow conditions simultaneously. Further, the latency for uncore configuration of memory tags may be high, requiring non-temporal memory writes or uncached writes to update ECC (Error Correction Code) memory. Reading the metadata may also be an issue with an uncore solution. For example, DCD provides a core solution for memory tagging, but table lookups via linear mapped memory create latency issues (potentially causing multiple memory accesses to fetch metadata, and associated cache thrashing) and/or require additional caching of tags. Additionally, separating the DCD tables from the memory data requires multiple memory reads, including one read to fetch the data and additional reads to fetch the table metadata (e.g., memory tags). Requiring serialization for the independent memory reads causes performance slowdown, while speculatively proceeding with the data processing without knowledge of the metadata access control policy (e.g. tag match check) may expose side channel vulnerabilities.

FIG. 1 is an illustration of insertion of metadata into a cacheline, in accordance with at least one embodiment described herein. As shown in FIG. 1, an apparatus or system 100 includes one or more processors 110, wherein the one or more processors may include a main processor such as a central processing unit (CPU) 112 or other similar unit, and one or more other processors 114. The one or more other processors 114 may include, but are not limited to, one or more graphics processing units (GPUs) or other types of processors (AI (Artificial Intelligence) accelerator, FPGA (Field Programmable Gate Array), etc.). Each of the one or more processors 110 may include multiple processor cores 116. The CPU 112 may include elements illustrated for CPU 412 in FIG. 4.

The apparatus or system 100 includes a memory 120 for the storage of data, and one or more caches 130 for the storage of data to increase speed of operation of the processor cores 116 of the one or more processors 110. For example, the one or more processors 110 may store data elements in any of the one or more caches 130 to provide for increased efficiency and performance. The caches 130 may include any level of cache, such as L1, L2, and/or L3 caches, and may be located within varying locations within the apparatus or system 100, including within the one or more processors 110. The apparatus or system 100 includes other elements not illustrated in FIG. 1, such as elements illustrated for processor-based device 700 in FIG. 7.

In some embodiments, the one or more processors 110 of the apparatus or system 100 are to insert metadata 140 into one or more cachelines 135 for storage and transfer of data between the memory 120 and the caches 130. In some embodiments, the metadata 140 is inserted as hidden inline metadata within the one or more cachelines 135. The metadata 140 is hidden at the linear address/virtual address level as memory is seen by software, but the metadata 140 is present and visible to the physical hardware and privileged software for the purposes such as memory tagging (such as tag compare with pointer tag value in linear address), capabilities (such as data structure length and permissions), and/or fine grain memory access control.

In some embodiments, an apparatus, system, or process is to provide efficient memory tagging in operation in which metadata lookup, such as lookup of metadata 140, is performed in the same cacheline and same cycle as the data accesses of the cacheline 135 that the metadata 140 is associated. This allows memory tags to be checked against a memory pointer tag (linear address tag) by a processor pipeline concurrently (at a same or overlapping time) with the data access occurring before the processor pipeline removes the tag metadata prior to, for example, a GPR (General Purpose Register) load. Stated in another way, access to the one or more memory tags of the first cacheline occurs in a same clock cycle as data access to the cacheline. In some embodiments, the implementation of hidden inline metadata for one or more cachelines enables memory tagging to detect use-after-free vulnerabilities (referring to vulnerabilities to attempts to access memory after it has been freed) or overflow/underflow conditions, and to provide other forms of access control at fine granularities. An embodiment offers a highest performance solution wherein data need not be acted upon speculatively without knowledge of the metadata policy for the data.

In some embodiments, implanting metadata within the cacheline 135 itself may be utilized to provide efficient lookup of the metadata 140 associated with the data on the same cacheline 135, allowing optimal memory tagging solutions, machine capability, and fine-grain memory access control. In some embodiments, a memory tagging solution may be extended to all of memory 120, and is not limited to small object allocations that fit within a cacheline. In some embodiments, a processor is to automatically skip over the metadata regions of memory as it is loading or storing linearly addressed data.

Figure 2:
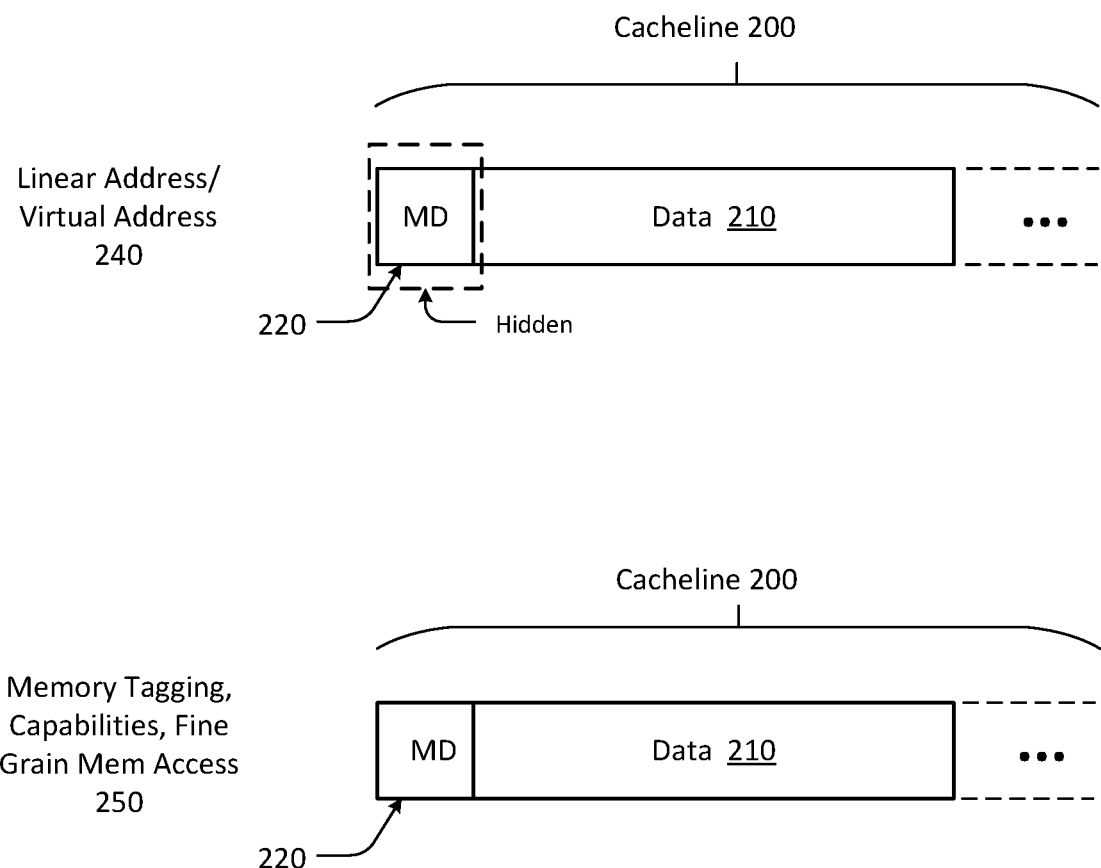
FIG. 2 is an illustration of insertion of metadata into a cacheline, in accordance with at least one embodiment described herein.

FIG. 2 is an illustration of insertion of metadata into a cacheline, in accordance with at least one embodiment described herein. As shown in FIG. 2, a cacheline 200 includes a data portion 210 and a metadata portion 220. The metadata portion 220 is hidden for purposes of contiguous linear address/virtual address operations 240, but may be conditionally visible and available to the physical hardware and privileged software for operations such as memory tagging, capabilities, and fine grain memory control 250.

In some embodiments, a system may include the following processor instructions:

StoreTag([in]Address,[in]tag) instruction: A new processor instruction called StoreTag to be called by the memory allocator/free (or other authorized software routine) to store/set a tag value associated with a particular memory location (linear address). The StoreTag is thus similar to a memory poke. The software setting a tag is required to have write access to the linear address associated with the tag to set the tag as determined by protected memory (e.g., page table permissions & meta bit). Thus, even though the metadata is hidden, the StoreTag instruction can update the hidden metadata corresponding to the addressed data location in memory.

LoadTag([in]address, [out]tag) instruction: A new processor instruction called LoadTag to be called by memory allocator (or other authorized software routine) to retrieve a tag value associated with a particular memory location (address). LoadTag is similar to a memory peek instruction. LoadTag may be utilized in connection with debugging and other operations, allowing software to retrieve the hidden metadata stored in memory.

In some embodiments, memory tagging allows software to select the tag bits within a linear address by setting non-canonical bits to the tag value (e.g., utilizing a C or C++ pointer). The linear address tags are then compared with the metadata tags stored in the hidden memory to determine if the memory access is authorized. For example, to detect use-after-free exploits, a memory allocation routine (e.g., malloc) is to set the authorized memory tag(s) (StoreTag) for the allocated memory location(s), and then provide software with a pointer value containing the matching tag value (color) addressing the allocated memory buffer. When the software executes and causes the allocated memory to be loaded (e.g., into a processor register or GPR) or stored to memory, the processor will first compare the tag value in the pointer (non-canonical bits of the linear address) with the metadata tag value stored in hidden memory for the specified memory location (linear address). Because the metadata tags are co-located with the data (hidden from software), no additional memory lookups or caching is required to fetch and compare the stored tag values. In this manner, an efficient solution for memory tagging and access control is provided. Meanwhile, OS kernel/VMM (Virtual Machine Monitor) is provided to access memory without the metadata page table bit set in its memory mapping to page-in/page-out memory pages including the tag metadata (metadata physical memory is larger than in LA space). Finally, an overflow memory region is used to store both extra data and metadata that goes beyond a physical page size.

Figure 3A:
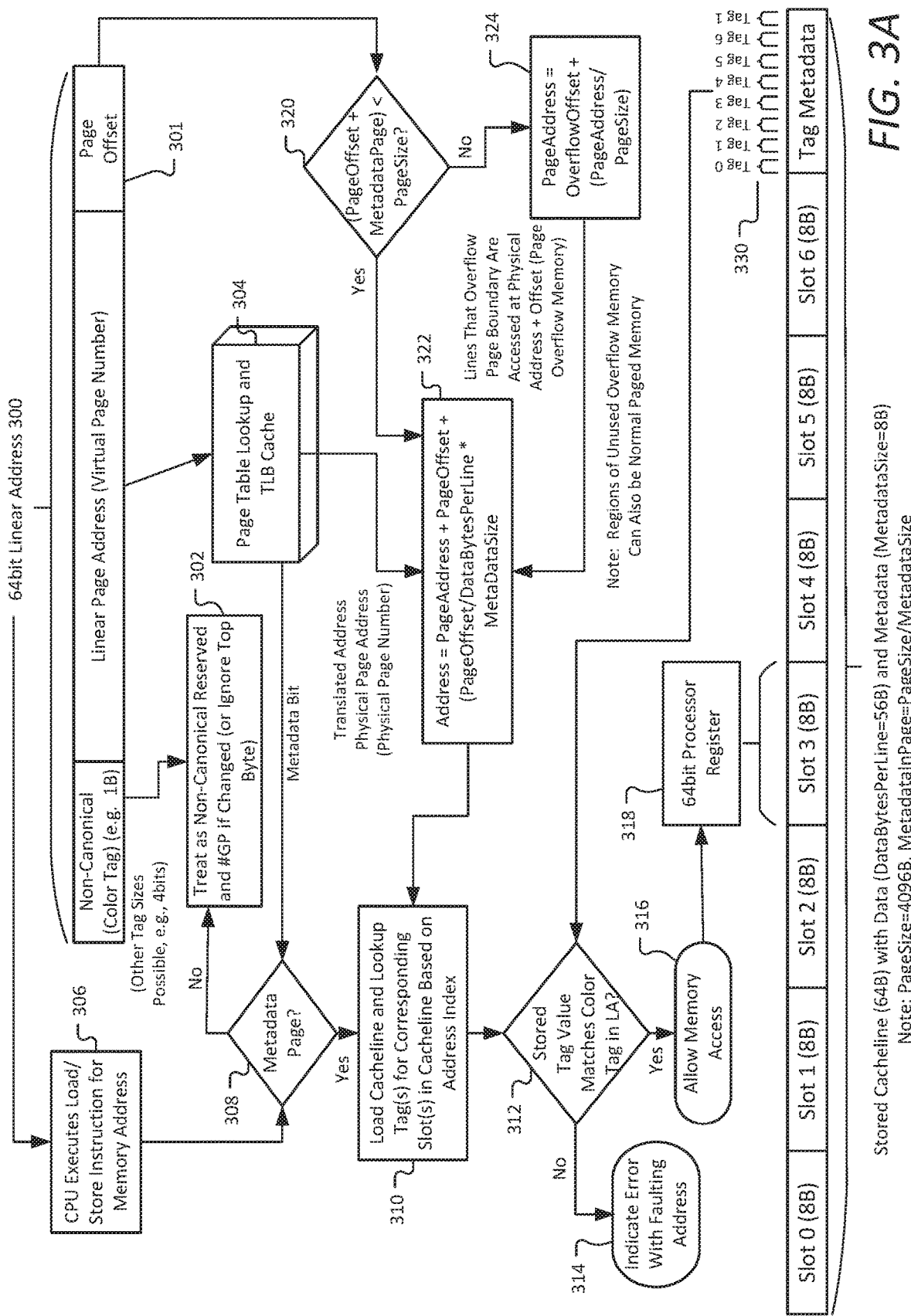
FIG. 3A is a flowchart to illustrate a process for handling data with hidden inline metadata, in accordance with at least one embodiment described herein.

FIG. 3A is a flowchart to illustrate a process for handling data with hidden inline metadata, in accordance with at least one embodiment described herein. As illustrated in FIG. 3, for a 64 bit linear address (as an example) there may be a linear address (indicating a location) together with non-canonical value bits, such as 1B in an example, as a color tag. As illustrated, the linear address is utilized for a page table lookup and TLB (Translation Lookaside Buffer) cache 304. If the non-canonical/color tag portion is treated as non-canonical reserved value, then a general protection exception (#GP) occurs if the value is changed (or, alternatively, the top byte may be ignored) 302. Otherwise, the linear address tag value may be compared with the metadata value stored in hidden memory for the associated address.

In an operation, a CPU (or other processor) is to execute a load or store an instruction for the memory address (the linear address/location portion) 306. If the memory address is not a metadata page 308, the data is treated as a non-canonical reserve value 302. In some embodiments, a determination whether the memory address is a metadata page may be determined by checking an identifier in a memory or storage, including, for example, checking whether one or more bits in a page table entry (which may be referred to as a metadata bit) are set to indicate the presence of metadata in a cacheline for the cachelines corresponding to the associated page. If the memory address is a metadata page, then the cacheline and lookup tags(s) for corresponding slots in the cacheline are loaded based on address index 310. There is then a determination whether the stored tag value (of the stored cacheline with tag metadata 330) matches the color tag value in the linear address 312. If not, then an error is indicated with the faulting address 314.

If there is a match 312, then memory access is allowed 316, illustrated as access to a 64 bit processor register 318, and the processor pipeline merging data slots for register load or memory store (shown as 60 bytes). The actual data location may be calculated based on the page offset 301, for example Address=PageAddress+PageOffset+(PageOffset/DataBytesPerLine)*MetaDataSize. This is illustrated in FIG. 3A, wherein if (PageOffset+MetadataPage) is less than PageSize 320, then Address=PageAddress+PageOffset+(PageOffset/DataBytesPerLine)*MetaDataSize 322. However, otherwise there is an overflow condition and lines that overflow are accessed at PhysicalAddress plus Offset, and thus PageAddress=OverflowOffset+(PageAddress/PageSize) 324.

If a software bug/vulnerability causes a freed pointer to be used to access newly allocated memory for another part of the program, when the newly stored tag values don't match the tag value in the freed pointer, then the processor will signal an error/exception/fault. Similarly, bounds checking is implicit by using the same tag value for all entries in the same array and then changing the tag value for adjacent memory locations that belong to other data structures.

In some embodiments, with a mechanism as illustrated in FIG. 3A, any granularity of memory tagging is possible, and may be enabled on a page by page basis. In the above illustration one byte of tag data is utilized to color 15 bytes of data (with ~6% memory overhead for metadata). Similarly, 4 bit tags could color 8B of data, etc., depending on the size and placement of the tag values. The processor pipeline will check and then remove/skip-over tag values from memory upon loading data into processor registers or buffers. Similarly, the processor pipeline will check the tags when storing data, skipping over the stored tags to complete the data store around the metadata data regions.

Embodiments are not limited to the specific process flow and operations illustrated in FIG. 3A. Varying embodiments are possible to process the data in connection with hidden inline metadata. Further, hidden inline metadata is not limited to the storage of tags as illustrated in FIG. 3A.

Figure 3B:
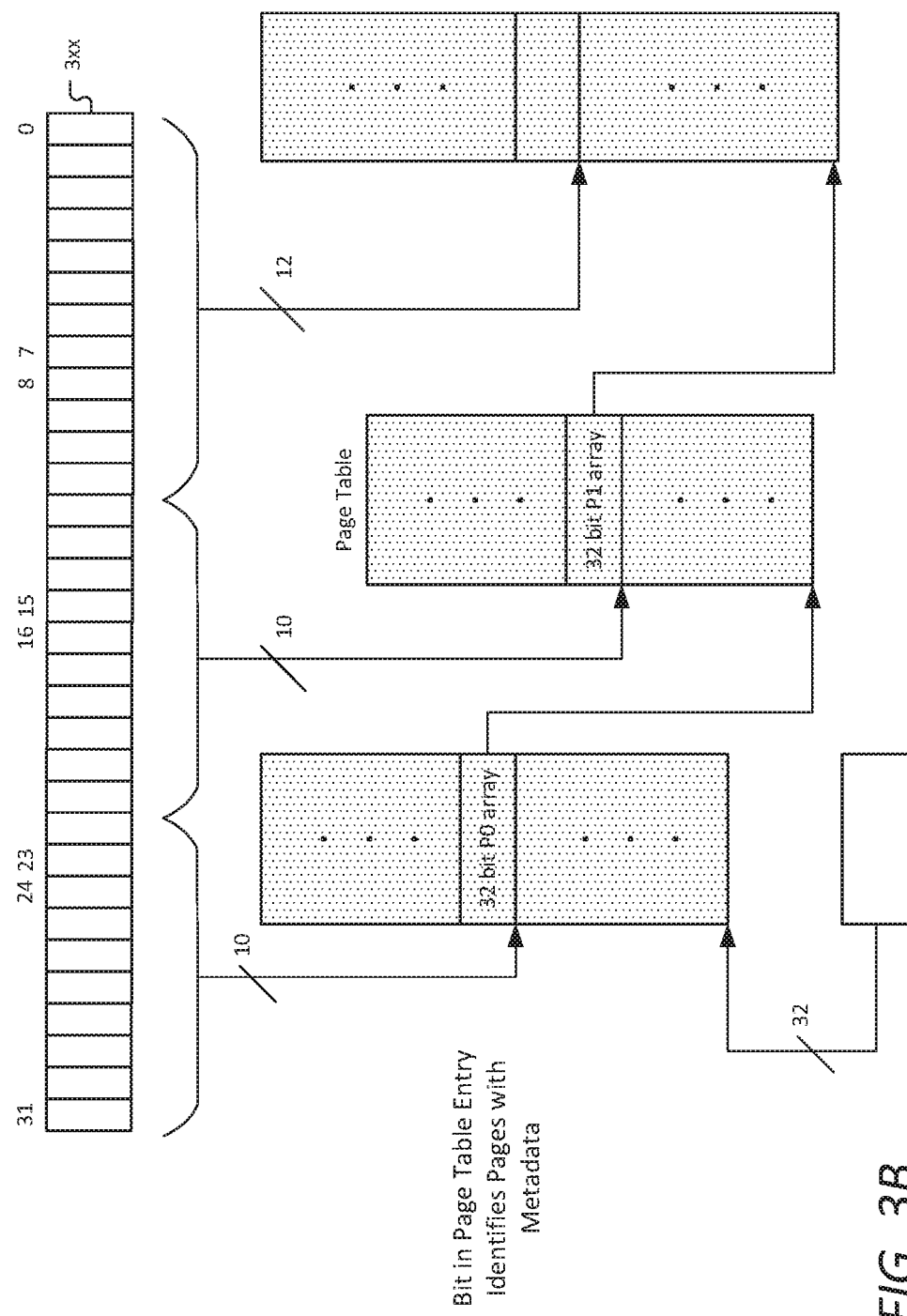
FIG. 3B is an illustration of memory storage for an apparatus or system including hidden inline metadata, in accordance with at least one embodiment described herein.

FIG. 3B is an illustration of memory storage for an apparatus or system including hidden inline metadata, in accordance with at least one embodiment described herein.

In some embodiments, as indicated in FIG. 3B, a bit in the page table entry identifies pages that contain hidden inline metadata, such as the example of a size with 128B larger than 4 KB. The kernel will operate with page in/page out 4 KB+128B, thus including the data and hidden inline metadata. If there is an overflow, for example, (PageOffset+ MetadataInPage)<PageSize, an operation is to fetch the next line in the page from the overflow memory region based on an offset. For example, PageAddress=OverflowOffset+ (PageAddress/PageSize).

Figure 4:
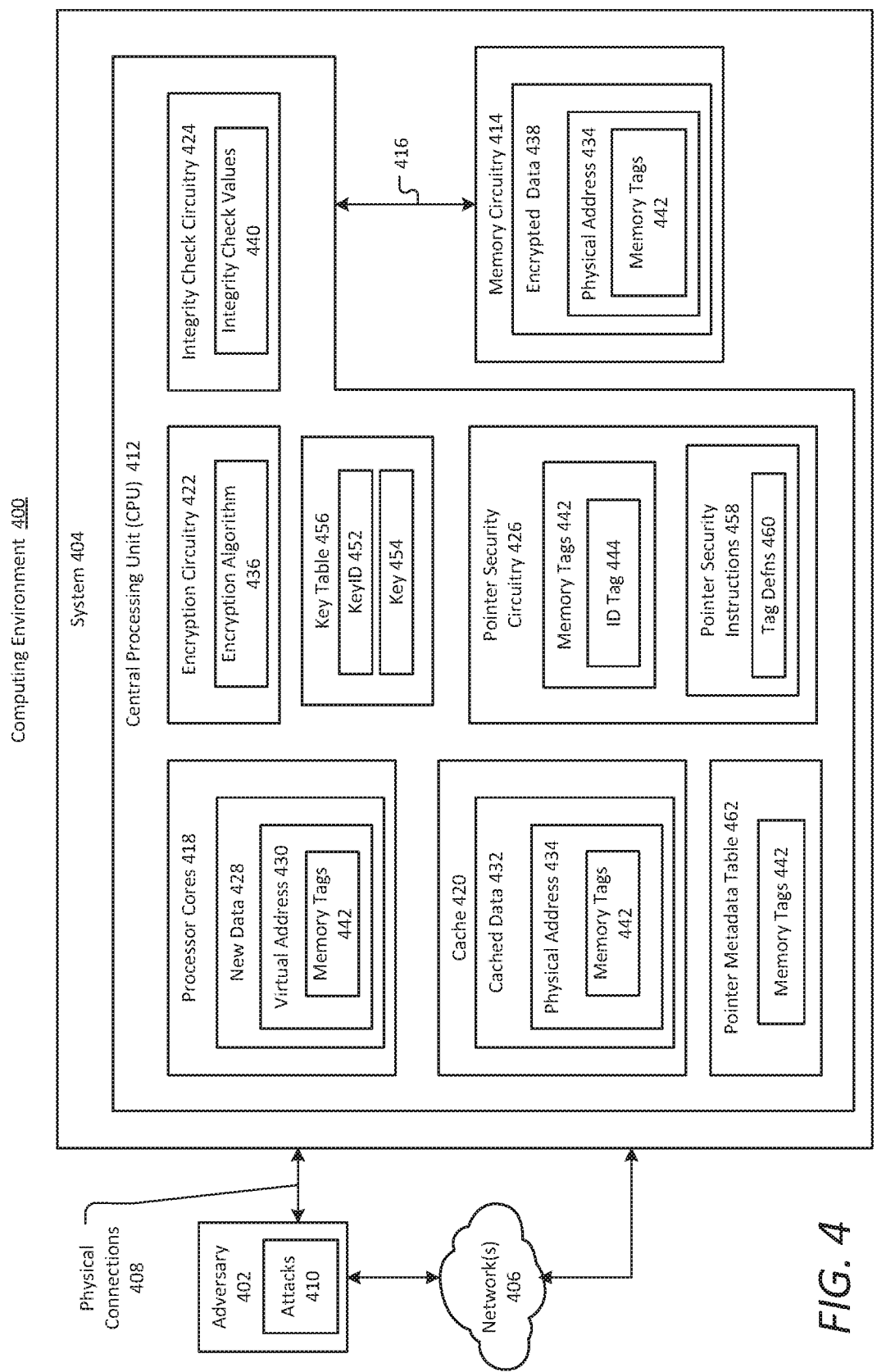
FIG. 4 is a block diagram of a computing environment 400 that reduces the likelihood of successful side-channel attacks within a central processing unit (CPU) by providing address-based security features for memory within the CPU, in accordance with at least one embodiment described herein.

FIG. 4 is a block diagram of a computing environment 400 that reduces the likelihood of successful side-channel attacks within a central processing unit (CPU) by providing address-based security features for memory within the CPU, in accordance with at least one embodiment described herein. The computing environment 400 reduces the likelihood of successful side-channel attacks and memory exploits, while concurrently enabling the CPU to perform and benefit from performing speculative operations, according to an embodiment. The computing environment 400 may include an adversary 402 coupled to a system 404 through one or more networks 406 or one or more physical connections 408, according to an embodiment. The adversary 402 may perform one or more memory exploits or side-channel attacks 410 on the system 404 through the networks 406 and/or through the physical connections 408. The system 404 may include one or more of a variety of computing devices, including, but not limited to, a personal computer, a server, a laptop, a tablet, a phablet, a smartphone, a motherboard with a chipset, or some other computing device, according to various embodiments. The system 404 is configured to protect a CPU 412 against side-channel attacks using a variety of address-based security features that enable the CPU to safely operate while performing speculative operations.

The adversary 402 may be a computing system, a person, or a combination of the computing system and a person, which may attempt one or more memory exploits or sides channel attacks on and against the system 404. The adversary 402 may use one or more networks 406 to execute the exploits and side-channel attacks 410. The adversary 402 may also use one or more physical connections 408, such as a memory interpose, memory probes, or the like, to read, modify, and/or write to one or more memory addresses within the system 404 in order to physically attack the system 404. Some of the attacks 410 may include attempting to override a pointer, attempting to manipulate up pointer (e.g., add they value to pointer to cause the pointer to point to an unintended object or move beyond the object's bounds), use a freed pointer to access a new object, and the like.

The system 404 is configured to provide a variety of memory-based security features to protect against the attacks 410, according to an embodiment. The system 404 includes base central processing unit (CPU) 412 which is coupled to memory circuitry 414 through one or more communications channels 416, according to an embodiment. The CPU 412 includes processor cores 418, cache 420, encryption circuitry 422, and integrity check circuitry 424, according to an embodiment. The CPU 412 also includes pointer security circuitry 426 that is configured to expand memory tag capabilities, reduce or prevent pointer override attacks, reduce or prevent pointer manipulation, prevent the reuse of freed pointers and enable byte-granularity memory safety for the CPU 412, according to an embodiment.

The CPU 412 may include any number and/or combination of currently available and/or future developed single- or multi-core central processing units. In embodiments, the CPU 412 may include a general-purpose processor, such as a Core® i3, i5, i7, 2 Duo and Quad, Xeon®, Itanium®, Atom®, or Quark® microprocessor, available from Intel® (Intel Corporation, Santa Clara, Calif.). Alternatively, the CPU 412 may include one or more processors from another manufacturer or supplier, such as Advanced Micro Devices (AMD®, Inc.), ARM Holdings® Ltd, MIPS®, etc. The CPU 412 may include a special-purpose processor, such as, for example, a network or communication processor, compression engine, graphics processor, co-processor, embedded processor, or the like. The CPU 412 may be implemented as a single semiconductor package or as a combination of stacked or otherwise interconnected semiconductor packages and/or dies. The CPU 412 may be a part of and/or may be implemented on one or more substrates using any of a number of process technologies, such as, for example, CMOS (Complementary Metal Oxide Semiconductor), BiC-MOS (Bipolar CMOS) or NMOS (N-type Metal Oxide Semiconductor).

The memory circuitry 414 represents one or more of a variety of types of memory that may be used in the system 404, according to an embodiment. The memory circuitry 414 may be volatile memory, may be non-volatile memory, or may be a combination of volatile memory and non-volatile memory, according to an embodiment. The volatile memory may include various types of random access memory (RAM). The non-volatile memory may include NAND memory, 3D crosspoint (3DXP), phase-change memory (PCM), hard disk drives, and the like, according to an embodiment.

The CPU 412 uses a number of components to move data back and forth between the CPU 412 and the memory circuitry 414, according to an embodiment. For example, while operating one or more software programs or while executing various instructions, the processor cores 418 may generate new data 428. The processor cores 418 may use a virtual address (a.k.a. Linear Address) 430 the new data 428 to write the new data 428 to the cache 420 or to the memory circuitry 414 via a translated physical address 434. The new data 428 may be saved in the cache 420 as cache data 432, or may be added to existing cached data 432, according to an embodiment. The cached data 432 may have a physical address 434 including KeyIDs, tags or additional memory tags 442. The CPU 412 may be configured to use the encryption circuitry 422 and an encryption algorithm 436 to encrypt the new data 428 and/or the cached data 432 prior to saving the new data 428 and/or the cached data 432 to the memory circuitry 414, as encrypted data 438. The CPU 412 may also use the integrity check circuitry 424 to generate integrity check values (or Message Authentication Codes/ MAC) 440 that are based on the new data 428, the translated virtual address 430, the tags 442 for selecting the cryptographic MAC Key 454, and/or the physical address 434, according to an embodiment. The CPU 412 writes the integrity check values 440 to the memory circuitry 414, to enable corruption detection for the encrypted data 438 (caused, for example, by decrypting the data with using the wrong key).

The CPU 412 may use the pointer security circuitry 426 to provide security for the data within the system 404. The pointer security circuitry 426 may be configured to detect when the virtual address 430 and/or the corresponding translated physical address 434 is being overridden, detect when the virtual address 430 and/or the physical address 434 has been manipulated, detect when the virtual address 430 and/or the physical address 434 has been used after being freed, provide byte-granularity memory safety through bounds checking, and provide definitions for use of memory tags, according to various embodiments disclosed herein. FIG. 4 and FIG. 9 illustrate example hardware configurations that may be used to support the security features provided by the pointer security circuitry 426. Various different memory tag configurations that may be identified, defined, and/or applied by the pointer security circuitry 426 to secure the system 404 from the attacks 410, according to various embodiments.

When the processor cores 418 assign (e.g., by executing a software program) the virtual address 430 to the new data 428, the pointer security circuitry 426 may define, insert, or identify one or more memory tags 442 in the virtual address 430, to associate with the new data 428 to reduce the likelihood of a successful attack.

The virtual address 430 for the new data 428 may include the identification tag 444 to provide security for the new data 428. The identification tag 444 may be colloquially referred to as a color, a memory color, a tag color, and the like. The identification tag 444 may include one or more bits of the virtual address 430. The pointer security circuitry 426 may be configured to define where within the virtual address 430 the identification tag 444 resides or is defined. For example, the pointer security circuitry 426 may define the identification tag 444 as the 8 most significant bits in the virtual address 430. The identification tag 444 may be defined as, for example, bits 56-62 (i.e., 7 bits) of bits 0-63 of the virtual address 430, assuming, as an example, that the length of the virtual address 430 is 64 bits.

The physical address 434 for the new data 428 may include the encryption tag 446 to provide security for the new data 428. The encryption tag 446 may include one or more bits of the physical address 434. The pointer security circuitry 426 may be configured to define where within the physical address 434 the encryption tag 446 resides or is defined. For example, the pointer security circuitry 426 may define the encryption tag 446 as the 3 most significant bits in the physical address 434. The encryption tag 446 may be defined as, for example, bits 59-62 (i.e., 3 bits) of bits 0-63 of the physical address 434, assuming, as an example, that the length of the physical address 434 is 64 bits. The physical address may also be smaller than the virtual address, such as 56 bits in size. The encryption tag 446 may be a representation of a key ID 452 that is used to look up the encryption key 454 within a key table 456, by the encryption circuitry 422, according to an embodiment. The encryption tag 446 may also or alternatively be identified using other techniques, e.g., may be defined within one or more bits in the physical address 434. The encryption tag may be assigned by the processor based on which VM is executing on a core or thread in a multi-tenant system, or may be determined by the translation of a virtual address into a physical address via the page tables or extended page tables (EPTs) utilized by a memory management unit to populate virtual to physical address translations via translation lookaside buffers (TLB).

The pointer security circuitry 426 may also include pointer security instructions 458 that at least partially provide tag definitions 460. The pointer security instructions 458 may include a number of instructions or operations that may be used by the pointer security circuitry 426 or the CPU 412 to add a pointer in accordance with the tag definitions 460.

Figure 5:
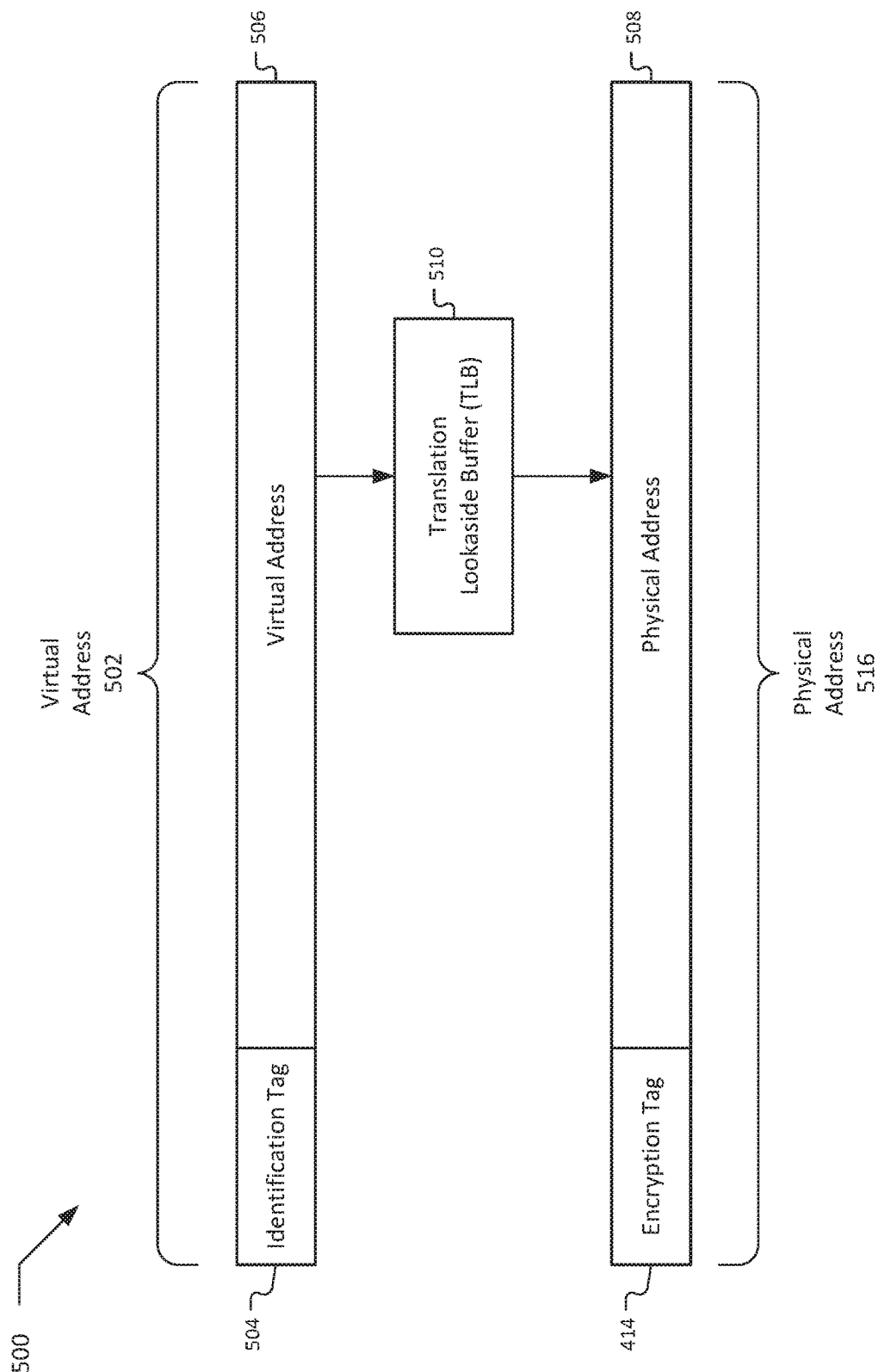
FIG. 5 illustrates a memory address translation diagram 600 of an implementation of memory tags that may be used to secure memory address pointers against attacks, in accordance with at least one embodiment described herein.

FIG. 5 illustrates a memory address translation diagram 600 of an implementation of memory tags that may be used to secure memory address pointers against attacks, in accordance with at least one embodiment described herein. The memory address translation diagram 500 illustrates a virtual address 502 that includes an identification tag 504 that occupies one or more otherwise unused address bits (e.g., non-canonical address bits) and a virtual address 506 for locating data that occupies a subset of the virtual address 502, according to an embodiment. The virtual address 502 may be 64 bits. The identification tag 504 may occupy one or more most significant bits, or other bits within the virtual address 502. The virtual address 506 is translated into a physical address 508 through a translation lookaside buffer (TLB) 510, according to an embodiment. An encryption tag 514 may be appended to the physical address 508 to identify one or more encryption keys through the key table 456 (shown in FIG. 4), according to an embodiment. The processor may select the encryption tag based on what Virtual Machine (VM) or other context is currently executing on a processor thread, or else determine the encryption tag from a page table walk and the resulting TLB.

Employing the memory tag architecture that is illustrated in the memory address translation diagram 500, within the virtual address 502 and the physical address 516, may enable the system 404 and/or the central processing unit 412 (shown in FIG. 4) to increase the size of identification tags 504 to increase the difficulty of an adversary in guessing which memory tag (e.g., identification tag 504 and/or encryption tag 514) that is associated with a particular memory address pointer and/or a particular object, according to an embodiment. Guessing the wrong tag results in faults/exceptions that prevents data disclosure from side-channel analysis as speculative execution in an embodiment.

In some embodiments, memory tags are used to secure memory address pointers against attacks in an operation, a CPU executes a load/store instruction for a virtual memory address that includes the identification tag. Objects within a cacheline may rely on meta-data tags also embedded in the same cacheline to determine if the correct identification tag in the virtual address was used to access the corresponding object.

The process further provides for loading a cacheline and looking up memory tags for corresponding slots in the cacheline, based on an address index (e.g., the least significant virtual address bits) and the data size (indicating the number of tags that need to be checked for the memory access), according to an embodiment. This may be performed after execution of the load/store instruction, speculatively before such operation, or concurrently with such operation, according to an embodiment. In all cases, the tag meta-data is available to the processor residing on the same cacheline, and, thus, does not require a separate memory load and cache line fill.

The meta-data tags in the cacheline are compared with the identification tag (e.g., "color" tags) in the virtual address, according to an embodiment. If the tags do not match (are not equal), there is an indication that an error has occurred, according to an embodiment. If the tags match, access to the memory address associated with the loaded cacheline is allowed, according to an embodiment. Notably, the hidden metadata allows the object data and the corresponding meta-data tags to occupy the same cacheline allowing the processor to immediately access the tag data and make an access control decision. Contrast this to speculation which may speculatively proceed with the data access while waiting for separate memory loads of meta-data tags to complete, resulting in either side-channels due to speculation or reduced performance while the processor waits for the separate meta-data load to complete.

In some embodiments, a stored cacheline is loaded with objects that may comprise a number of slots, which are subsets of the cacheline. One of the slots of the stored cacheline may include tag metadata, according to an embodiment. The tag metadata may include a tag (e.g., a 1 byte identification tag) for each of the slots of the stored cacheline, according to an embodiment. The tag metadata provides sub-cacheline granularity to assign memory tags with memory address pointers or with objects, to reduce the likelihood of successful attacks.

Memory tags and tag metadata of various sizes, positions and formats may be used to provide memory tagging security with sub-cacheline granularity, according to an embodiment. The stored cacheline includes a slot for tag metadata that is associated with 7 slots, according to an embodiment. The slots may include an additional byte or bits of metadata that may be used to support additional memory tagging functionality, according to an embodiment. There is an extra byte tag for the first slot, that can be used to access control the first slot containing the 8 bytes of meta data (tags), for example, limiting access to the memory allocation routines that know the correct identification tag to access the meta-data slot. Virtual addresses corresponding to the first slot may be binary bx . . . x000xxx, second slot bx . . . x001xxx, third bx . . . x0IOxxx, fourth bx . . . x01 1xxx, etc. In other words, those three address bits third from the least significant address bit determine which meta data tag to use based on which slot(s) is being accessed by the memory reference. The extent of the slots that a data access comprises is determined by the instruction or operation being executed by the processor. For example, moving contents from memory to a 64 bit general purpose register in the processor may comprise one 8 byte slot, requiring the checking of the one corresponding meta-data tag, whereas loading a 128 bit XMM register may require checking the tags corresponding two contiguous slots occupied by the 128 bit SSE data in memory.

Figure 6A:
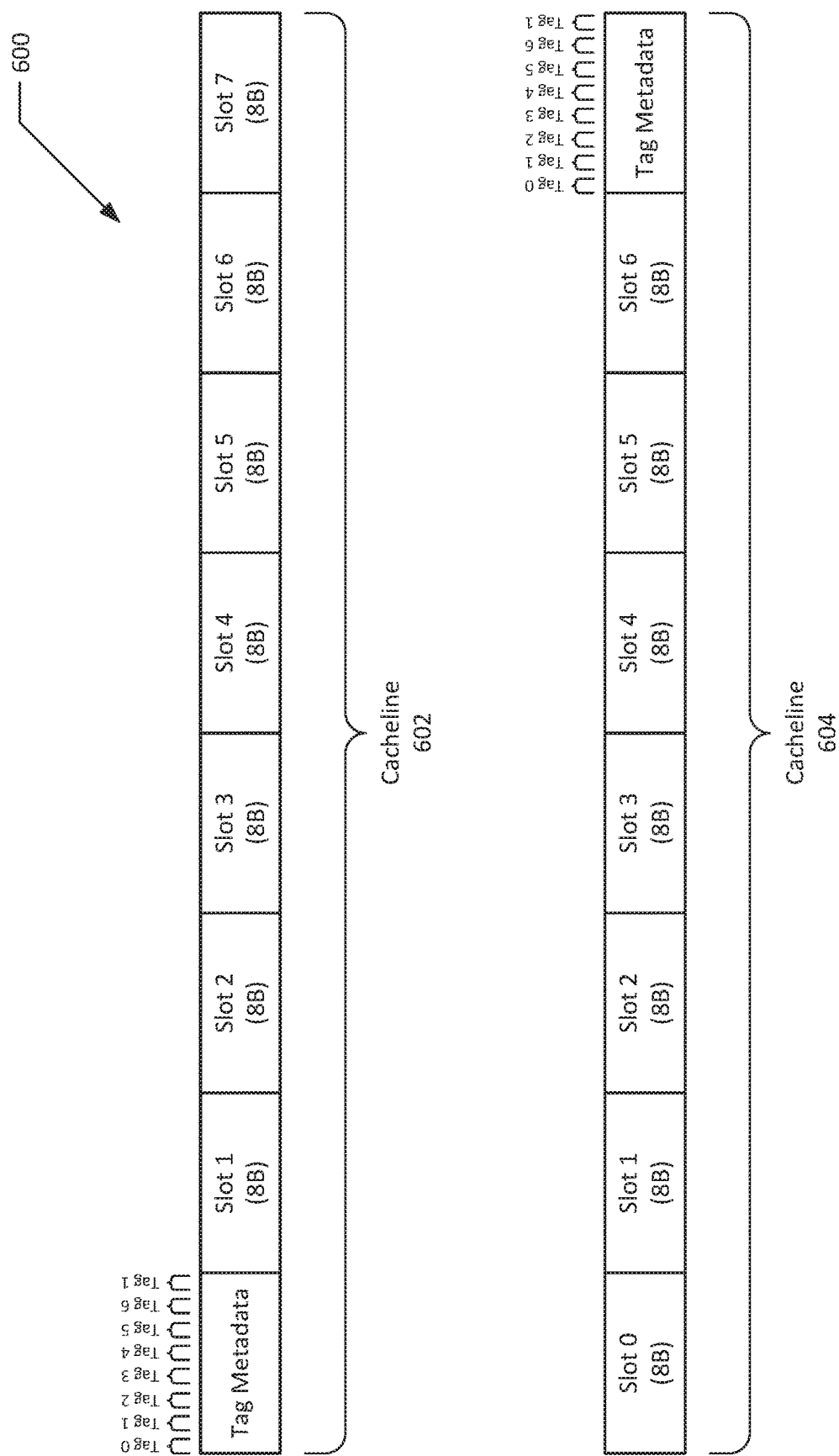
FIG. 6A illustrates a block diagram of different tag metadata configurations for cachelines, in accordance with at least one embodiment described herein.

FIG. 6A illustrates a block diagram 600 of different tag metadata configurations for cachelines, in accordance with at least one embodiment described herein. The block diagram 600 includes a first cacheline 602 and a second cacheline 604. In one implementation of tag metadata in cachelines, a cacheline such as the first cacheline 602 is configured to store a tag metadata in the most significant bits of the cacheline and a cacheline such as the second cacheline 604 is configured to store tag metadata in the least significant bits of the cacheline. Other slots of the cachelines may be used to store tag metadata, according to various embodiments. This format for hidden meta-data allows small objects to cross cacheline boundaries in a contiguous fashion, thus allowing incrementing pointers (virtual addresses) to access the full extent of objects that may be larger than a single cacheline. For example, arrays in C or C++ languages are accessed by incrementing the array pointer (virtual address) in a contiguous fashion, allowing the hidden tag meta-data to be verified against the virtual address identification tag for each slot comprising the array.

Software, such as glibc memory allocator library, is responsible for assigning identification tags and initializing memory. For example, when memory is first allocated via the malloc function for a certain size, the malloc function will determine the size. It will then return the virtual address with this identification tag to the caller.

The malloc routine will identify a freed block of memory, set the meta-data tags to a value corresponding to the pointer's virtual address identification tag returning this pointer to the caller. Malloc can access and set the hidden tag meta-data by using the LoadTag and StoreTag instructions. Similarly, when freeing allocated memory via the free routine, the memory manager may access the memory tag location for the size of the freed memory, setting the hidden tag meta-data to another value to prevent use-after-free of the previous pointer identification tags, thus, preventing use-after-free exploits.

Figure 6B:
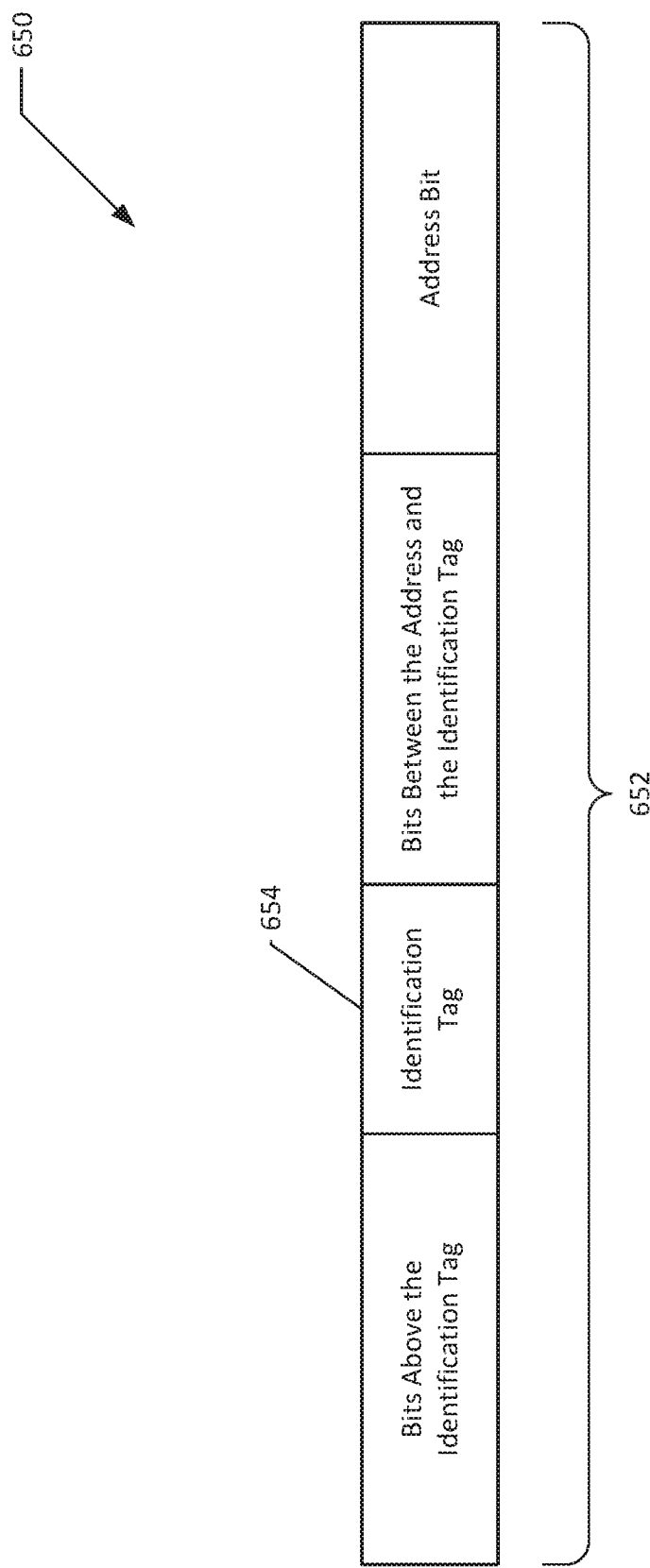
FIG. 6B illustrates a block diagram of a virtual memory address that illustrates that an identification tag may be stored in various locations within the virtual memory address.

FIG. 6B illustrates a block diagram 650 of a virtual memory address 652 that illustrates that an identification tag 654 (e.g., a color tag) may be stored in various locations within the virtual memory address. The identification tag 654 may occupy one or more bits within the virtual memory address 652 such that the virtual memory address 652 includes one or more bits above the identification tag 654 and one or more bits between the identification tag and the portion of the virtual memory address that is translated into the physical address (e.g., through a translation lookaside buffer).

Figure 7:
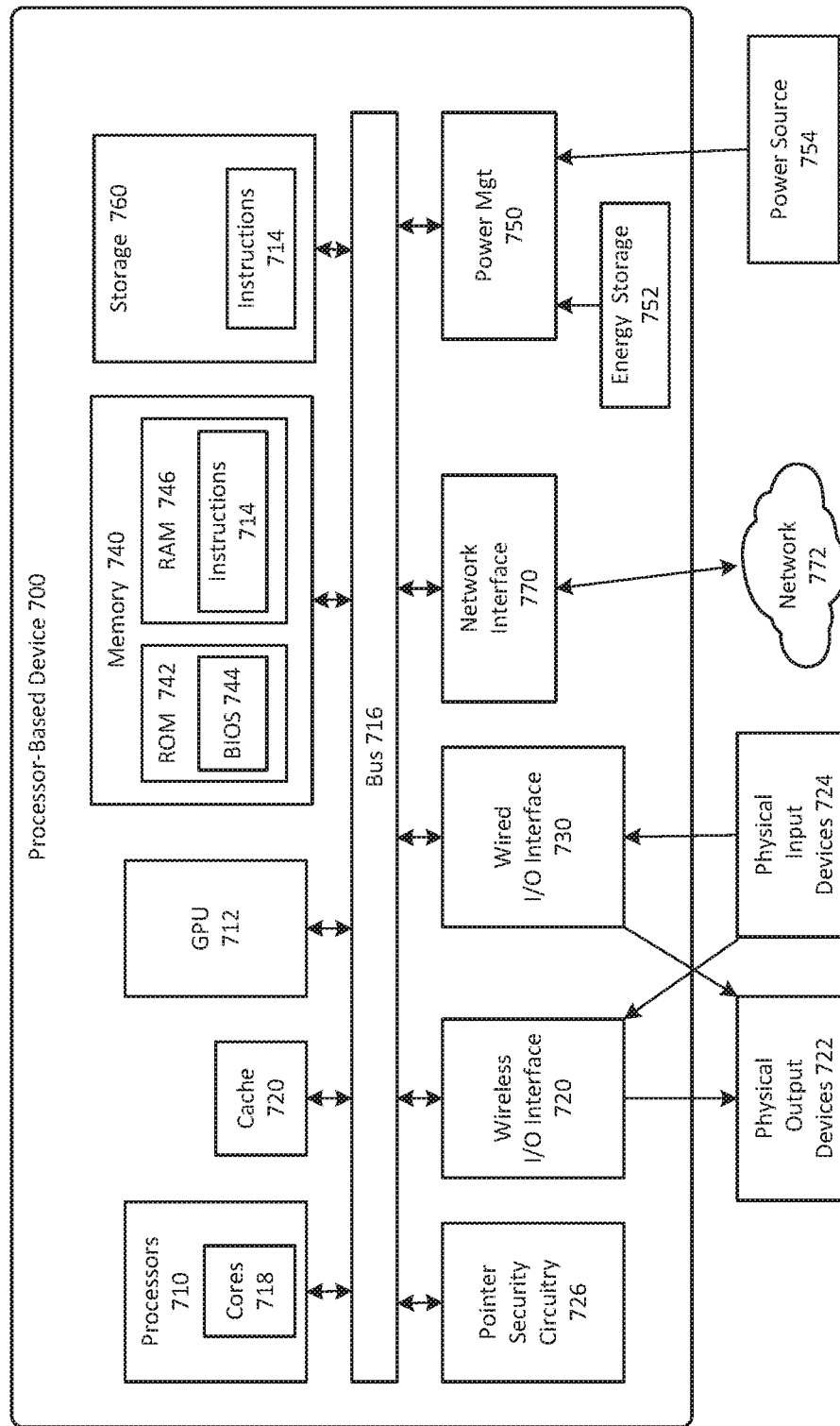
FIG. 7 is a block diagram of a system for using various memory tags to secure memory against side-channel attacks, in accordance with at least one embodiment described herein.

FIG. 7 is a schematic diagram of an illustrative electronic, processor-based, device 700 that includes pointer security circuitry 726 configured to use various memory tags to secure memory against side-channel attacks, in accordance with at least one embodiment described herein. The processor-based device 700 may additionally include one or more of the following: one or more processors 710 including processor cores 718, cache 720, a graphical processing unit (GPU) 712, a wireless input/output (I/O) interface 720, a wired I/O interface 730, memory circuitry 740, power management circuitry 750, non-transitory storage device 760, and a network interface 770 with network 772. The following discussion provides a brief, general description of the components forming the illustrative processor-based device 700. Example, non-limiting processor-based devices 700 may include: smartphones, wearable computers, portable computing devices, handheld computing devices, desktop computing devices, blade server devices, workstations, and similar.

In embodiments, the processor-based device 700 includes processor cores 718 capable of executing machine-readable instruction sets 714, reading data and/or instruction sets 714 from one or more storage devices 760 and writing data to the one or more storage devices 760. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 718 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The processor-based device 700 includes a bus or similar communications link 716 that communicably couples and facilitates the exchange of information and/or data between various system components including the processor cores 718, the cache 720, the graphics processor circuitry 712, one or more wireless I/O interfaces 720, one or more wired I/O interfaces 730, one or more storage devices 760, and/or one or more network interfaces 770. The processor-based device 700 may be referred to in the singular herein, but this is not intended to limit the embodiments to a single processor-based device 700, since in certain embodiments, there may be more than one processor-based device 700 that incorporates, includes, or contains any number of communicably coupled, collocated, or remote networked circuits or devices.

The processor cores 718 may include any number, type, or combination of currently available or future developed devices capable of executing machine-readable instruction sets.

The processor cores 718 may include (or be coupled to) but are not limited to any current or future developed single- or multi-core processor or microprocessor, such as: on or more systems on a chip (SOCs); central processing units (CPUs); digital signal processors (DSPs); graphics processing units (GPU s); application-specific integrated circuits (ASICs), programmable logic units, field programmable gate arrays (FPGAs), and the like. Unless described otherwise, the construction and operation of the various blocks shown in FIG. 7 are of conventional design. Consequently, such blocks need not be described in further detail herein, as they will be understood by those skilled in the relevant art. The bus 716 that interconnects at least some of the components of the processor-based device 700 may employ any currently available or future developed serial or parallel bus structures or architectures.

The system memory 740 may include read-only memory ("ROM") 742 and random access memory ("RAM") 746. A portion of the ROM 742 may be used to store or otherwise retain a basic input/output system ("BIOS") 744. The BIOS 744 provides basic functionality to the processor-based device 700, for example by causing the processor cores 718 to load and/or execute one or more machine-readable instruction sets 714. In embodiments, at least some of the one or more machine-readable instruction sets 714 cause at least a portion of the processor cores 718 to provide, create, produce, transition, and/or function as a dedicated, specific, and particular machine, for example a word processing machine, a digital image acquisition machine, a media playing machine, a gaming system, a communications device, a smartphone, or similar.

The processor-based device 700 may include at least one wireless input/output (I/O) interface 720. The at least one wireless I/O interface 720 may be communicably coupled to one or more physical output devices 722 (tactile devices, video displays, audio output devices, hardcopy output devices, etc.). The at least one wireless I/O interface 720 may communicably couple to one or more physical input devices 724 (pointing devices, touchscreens, keyboards, tactile devices, etc.). The at least one wireless I/O interface 720 may include any currently available or future developed wireless I/O interface. Example wireless I/O interfaces include, but are not limited to: BLUETOOTH®, near field communication (NFC), and similar.

The processor-based device 700 may include one or more wired input/output (I/O) interfaces 730. The at least one wired I/O interface 730 may be communicably coupled to one or more physical output devices 722 (tactile devices, video displays, audio output devices, hardcopy output devices, etc.). The at least one wired I/O interface 730 may be communicably coupled to one or more physical input devices 724 (pointing devices, touchscreens, keyboards, tactile devices, etc.). The wired I/O interface 730 may include any currently available or future developed I/O interface. Example wired I/O interfaces include, but are not limited to: universal serial bus (USB), IEEE 1394 ("FireWire"), and similar.

The processor-based device 700 may include one or more communicably coupled, non-transitory, data storage devices 760. The data storage devices 760 may include one or more hard disk drives (HDDs) and/or one or more solid-state storage devices (SSDs). The one or more data storage devices 760 may include any current or future developed storage appliances, network storage devices, and/or systems. Non-limiting examples of such data storage devices 760 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 760 may include one or more removable storage devices, such as one or more flash drives, flash memories, flash storage units, or similar appliances or devices capable of communicable coupling to and decoupling from the processor-based device 700.

The one or more data storage devices 760 may include interfaces or controllers (not shown) communicatively coupling the respective storage device or system to the bus 716. The one or more data storage devices 760 may store, retain, or otherwise contain machine-readable instruction sets, data structures, program modules, data stores, databases, logical structures, and/or other data useful to the processor cores 718 and/or graphics processor circuitry 712 and/or one or more applications executed on or by the processor cores 718 and/or graphics processor circuitry 712. In some instances, one or more data storage devices 760 may be communicably coupled to the processor cores 718, for example via the bus 716 or via one or more wired communications interfaces 730 (e.g., Universal Serial Bus or USB); one or more wireless communications interfaces 720 (e.g., Bluetooth®, Near Field Communication or NFC); and/or one or more network interfaces 770 (IEEE 802.3 or Ethernet, IEEE 802.11, or WiFi®, etc.).

Processor-readable instruction sets 714 and other programs, applications, logic sets, and/or modules may be stored in whole or in part in the system memory 740. Such instruction sets 714 may be transferred, in whole or in part, from the one or more data storage devices 760. The instruction sets 714 may be loaded, stored, or otherwise retained in system memory 740, in whole or in part, during execution by the processor cores 718 and/or graphics processor circuitry 712.

The processor-based device 700 may include power management circuitry 750 that controls one or more operational aspects of the energy storage device 752. In embodiments, the energy storage device 752 may include one or more primary (i.e., non-rechargeable) or secondary (i.e., rechargeable) batteries or similar energy storage devices. In embodiments, the energy storage device 752 may include one or more supercapacitors or ultracapacitors. In embodiments, the power management circuitry 750 may alter, adjust, or control the flow of energy from an external power source 754 to the energy storage device 752 and/or to the processor-based device 700. The power source 754 may include, but is not limited to, a solar power system, a commercial electric grid, a portable generator, an external energy storage device, or any combination thereof For convenience, the processor cores 718, the graphics processor circuitry 712, the wireless I/O interface 720, the wired I/O interface 730, the storage device 760, and the network interface 770 are illustrated as communicatively coupled to each other via the bus 716, thereby providing connectivity between the above-described components. In alternative embodiments, the above-described components may be communicatively coupled in a different manner than illustrated in FIG. 7. For example, one or more of the above-described components may be directly coupled to other components, or may be coupled to each other, via one or more intermediary components (not shown). In another example, one or more of the above-described components may be integrated into the processor cores 718 and/or the graphics processor circuitry 712. In some embodiments, all or a portion of the bus 716 may be omitted and the components are coupled directly to each other using suitable wired or wireless connections.

Figure 8:
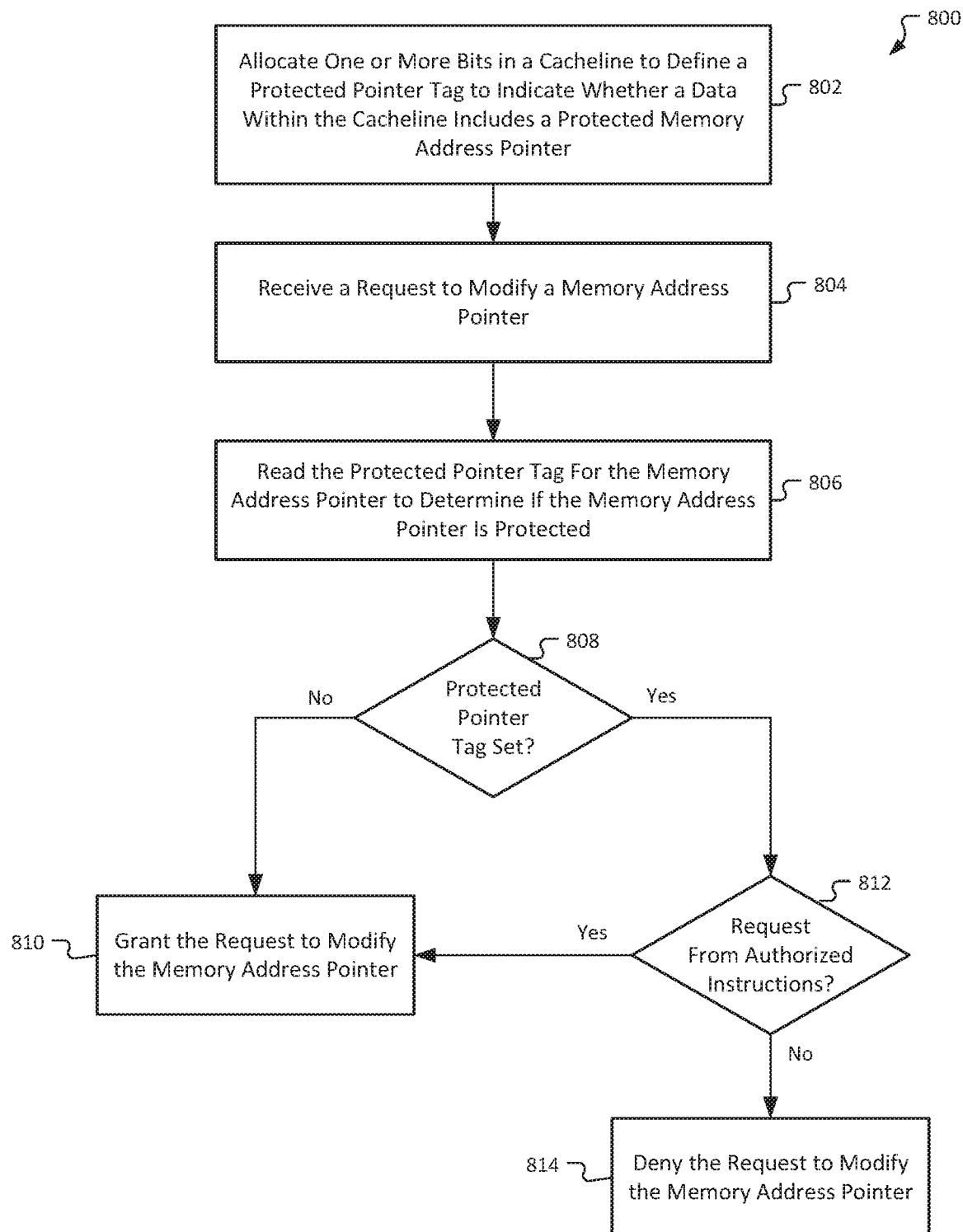
FIG. 8 is a flow diagram of a process for using memory tagging to provide an isolated environment ("a sandbox") for untrusted software, in accordance with at least one embodiment described herein.

FIG. 8 illustrates a flow diagram of a method 800 for using memory tagging to provide an isolated environment ("a sandbox") for untrusted software, consistent with embodiments of the present disclosure. The isolated environment may include hardware (e.g., the pointer security circuitry 426—shown in FIG. 4) and may include firmware, software, or other instructions (e.g., the pointer security instructions 458—shown in FIG. 4).

At operation 802, the method 800 allocates one or more bits in a cacheline to define a protected pointer tag to indicate whether data within the cacheline includes a protected memory address pointer, according to an embodiment. The data within the cacheline may be a word of data.

At operation 804, the method 800 receives a request to modify a memory address pointer, according to an embodiment.

At operation 806, the method 800 reads the protected pointer tag for the memory address pointer to determine if the memory address pointer is protected, according to an embodiment.

At operation 808, the method 800 determines whether the protected pointer tag is set, according to an embodiment. If the protected pointer tag is not set, operation 808 proceeds to operation 810. If the protected pointer tag is set, operation 808 proceeds to operation 812.

At operation 810, the method 800 grants the request to modify the memory address pointer, according to one embodiment.

At operation 812, the method 800 determines whether the request to modify the memory address pointer was made with authorized pointer security instructions. If the request was made with authorized pointer security instructions, operation 812 proceeds to operation 810, where the request is granted. If the request was not made with authorized pointer security instructions, operation 812 proceeds to operation 814, wherein the request is denied.

Embodiments of the disclosed technology may be used to sandbox untrusted software. Other usages described herein (memory tagging, capabilities, integrity, etc.) may also be applied to various memory data types (float, integer, string, stack pointer, return address, etc.), control registers (CR3 (used in relation to translating linear addresses into physical addresses), IDTR (Interrupt Descriptor Table Register)), buffer length (off-by-one byte detection), and Integrity Check Value/MAC (detects memory corruption).

In some embodiments, an apparatus includes a plurality of processor cores; a computer memory for storage of data; and cache memory communicatively coupled with one or more of the processor cores, wherein one or more processor cores of the plurality of processor cores are to implant hidden inline metadata in one or more cachelines for the cache memory, the hidden inline metadata being hidden at a linear address level.

In some embodiments, the hidden inline metadata is available for purposes for one or more of memory tagging, identification of capabilities, and fine grain memory access control.

In some embodiments, the apparatus further includes pointer security circuitry to define a plurality of memory tags in memory address pointers; and encryption circuitry to cryptographically secure data objects at least partially based on the plurality of memory tags, wherein the hidden inline metadata for a first cacheline includes one or more memory tags.

In some embodiments, the one or more processor cores are further to compare the one or more memory tags in the hidden inline metadata for the first cacheline with a memory pointer tag value in a linear address to determine whether a memory access is authorized.

In some embodiments, the one or more processor cores to compare the one or more memory tags of the first cacheline with the memory pointer tag at a same or overlapping time with data access to the cacheline.

In some embodiments, software run by the plurality of processor cores are to skip over one or more regions of memory for the metadata inserted in the one or more cachelines during loading or storing of linear addressed data.

In some embodiments, the one or more processor cores are to set an indicator in a memory or storage to indicate presence of the hidden inline metadata in the one or more cachelines.

In some embodiments, the indicator includes one or more bits of a page table.

In some embodiments, one or more non-transitory computer-readable storage mediums having stored thereon executable computer program instructions that, when executed by one or more processors, cause the one or more processors to perform operations including implanting hidden inline metadata for one or more memory tags memory tags in one or more cachelines for a cache memory, the hidden inline metadata being hidden at a linear address level; and setting an indicator to indicate presence of the hidden inline metadata in the one or more cachelines.

In some embodiments, the instructions include instructions for utilizing the hidden inline metadata for one or more of memory tagging, identification of capabilities, and fine grain memory access control.

In some embodiments, the instructions include instructions for utilizing the memory tags to detect one or more of use-after-free vulnerabilities or overflow/underflow conditions.

In some embodiments, the instructions include instructions for defining one or more memory tags in memory address pointers; and cryptographically securing data objects at least partially based on one or more of the memory tags, wherein the hidden inline metadata for a first cacheline includes one or more memory tags.

In some embodiments, the instructions include instructions for comparing the one or more memory tags in the hidden inline metadata for the first cacheline with a memory pointer tag value in a linear address and determining whether a memory access is authorized based at least in part on the comparison of the one or more memory tags to the memory pointer tag.

In some embodiments, access to the one or more memory tags of the first cacheline occurs in a same clock cycle as data access to the cacheline.

In some embodiments, one or more regions of memory for the metadata inserted in the one or more cachelines are skipped during loading or storing of linear addressed data.

In some embodiments, the instructions include instructions for setting an indicator in a memory or storage to indicate presence of the hidden inline metadata in the one or more cachelines.

In some embodiments, the indicator includes one or more bits of a page table.

In some embodiments, a method includes implanting hidden inline metadata for one or more memory tags memory tags in one or more cachelines for a cache memory, the hidden inline metadata being hidden at a linear address level; and setting an indicator to indicate presence of the hidden inline metadata in the one or more cachelines.

In some embodiments, the method further includes utilizing the hidden inline metadata for one or more of memory tagging, identification of capabilities, and fine grain memory access control.

In some embodiments, the method further includes utilizing the memory tags to detect one or more of use-after-free vulnerabilities or overflow/underflow conditions.

In some embodiments, the method further includes defining one or more memory tags in memory address pointers; and cryptographically securing data objects at least partially based on one or more of the memory tags, wherein the hidden inline metadata for a first cacheline includes one or more memory tags.

In some embodiments, the method further includes comparing the one or more memory tags in the hidden inline metadata for the first cacheline with a memory pointer tag value in a linear address; and determining whether a memory access is authorized based at least in part on the comparison of the one or more memory tags to the memory pointer tag.

In some embodiments, access to the one or more memory tags of the first cacheline occurs in a same clock cycle as data access to the cacheline.

In some embodiments, the method further includes skipping one or more regions of memory for the metadata inserted in the one or more cachelines during loading or storing of linear addressed data.

In some embodiments, the method further includes setting an indicator in a memory or storage to indicate presence of the hidden inline metadata in the one or more cachelines.

In some embodiments, an apparatus includes means for implanting hidden inline metadata for one or more memory tags memory tags in one or more cachelines for a cache memory, the hidden inline metadata being hidden at a linear address level; and means for setting an indicator to indicate presence of the hidden inline metadata in the one or more cachelines.

In some embodiments, the apparatus further includes means for utilizing the hidden inline metadata for one or more of memory tagging, identification of capabilities, and fine grain memory access control.

In some embodiments, the apparatus further includes means for utilizing the memory tags to detect one or more of use-after-free vulnerabilities or overflow/underflow conditions.

In some embodiments, the apparatus further includes means for defining one or more memory tags in memory address pointers; and means for cryptographically securing data objects at least partially based on one or more of the memory tags, wherein the hidden inline metadata for a first cacheline includes one or more memory tags.

In some embodiments, the apparatus further includes means for comparing the one or more memory tags in the hidden inline metadata for the first cacheline with a memory pointer tag value in a linear address; and means for determining whether a memory access is authorized based at least in part on the comparison of the one or more memory tags to the memory pointer tag.

In some embodiments, access to the one or more memory tags of the first cacheline occurs in a same clock cycle as data access to the cacheline.

In some embodiments, the means for skipping one or more regions of memory for the metadata inserted in the one or more cachelines during loading or storing of linear addressed data.

In some embodiments, the apparatus further includes means for setting an indicator in a memory or storage to indicate presence of the hidden inline metadata in the one or more cachelines.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. An apparatus comprising:
a plurality of processor cores; and
memory for storage of data;
wherein one or more processor cores of the plurality of processor cores are to implant hidden inline metadata in one or more portions of the memory, hidden inline metadata for a first portion of the memory including one or more memory tags, the hidden inline metadata being hidden for linear address operations; and
wherein the one or more processor cores are to compare the one or more memory tags in the hidden inline metadata for the first portion of the memory with a memory pointer tag value in a linear address to determine whether a memory access is authorized.

2. The apparatus of claim 1, wherein the hidden inline metadata is visible and available for physical hardware or privileged software operation.

3. The apparatus of claim 1, wherein the one or more processor cores are further to store or update a memory tag value in the hidden inline metadata in response to a processor instruction.

4. The apparatus of claim 3, wherein the one or more processor cores are further to retrieve a memory tag value from the hidden inline metadata in response to a processor instruction.

5. The apparatus of claim 1, further comprising:
pointer security circuitry to define a plurality of memory tags in memory address pointers; and
encryption circuitry to cryptographically secure data objects at least partially based on the plurality of memory tags.

6. The apparatus of claim 1, wherein the one or more processor cores are to compare the one or more memory tags of the first portion with the memory pointer tag value at a same or overlapping time with data access to the first portion.

7. The apparatus of claim 1, wherein software run by the plurality of processor cores is to skip over one or more regions of memory for the hidden inline metadata inserted in the one or more portions of the memory during loading or storing of linear addressed data.

8. The apparatus of claim 1, wherein the one or more processor cores are further to set an indicator in a memory or storage to indicate presence of the hidden inline metadata in the one or more portions of the memory.

9. The apparatus of claim 8, wherein the indicator includes one or more bits of a page table.

10. The apparatus of claim 1, wherein the memory includes a cache memory.

11. One or more non-transitory computer-readable storage mediums having stored thereon executable computer program instructions that, when executed by one or more processors, cause the one or more processors to perform operations comprising:
implanting hidden inline metadata in one or more portions of a memory of a computing system, hidden inline metadata for a first portion of the memory including one or more memory tags, the hidden inline metadata being hidden for linear address operations; and
comparing the one or more memory tags in the hidden inline metadata for the first portion of the memory with a memory pointer tag value in a linear address to determine whether a memory access is authorized.

12. The one or more mediums of claim 11, wherein the instructions include instructions for:
defining one or more memory tags in memory address pointers; and
cryptographically securing data objects at least partially based on one or more of the memory tags.

13. The one or more mediums of claim 11, wherein the instructions include instructions for:
comparing the one or more memory tags of the first portion with the memory pointer tag value at a same or overlapping time with data access to the first portion.

14. The one or more mediums of claim 11, wherein the instructions include instructions for:
skipping over one or more regions of memory for the hidden inline metadata inserted in the one or more portions of the memory during loading or storing of linear addressed data.

15. The one or more mediums of claim 11, wherein the instructions include instructions for:
setting an indicator in a memory or storage to indicate presence of the hidden inline metadata in the one or more portions of the memory.

16. A method comprising:
implanting hidden inline metadata in one or more portions of a memory of a computing system, hidden inline metadata for a first portion of the memory including one or more memory tags, the hidden inline metadata being hidden for linear address operations; and
comparing the one or more memory tags in the hidden inline metadata for the first portion of the memory with a memory pointer tag value in a linear address to determine whether a memory access is authorized.

17. The method of claim 16, further comprising:
defining one or more memory tags in memory address pointers; and
cryptographically securing data objects at least partially based on one or more of the memory tags.

18. The method of claim 16, further comprising:
comparing the one or more memory tags of the first portion with the memory pointer tag value at a same or overlapping time with data access to the first portion.

19. The method of claim 16, further comprising:

skipping over one or more regions of memory for the hidden inline metadata inserted in the one or more portions of the memory during loading or storing of linear addressed data.

20. The method of claim 16, further comprising:

setting an indicator in a memory or storage to indicate presence of the hidden inline metadata in the one or more portions of the memory.

\* \* \* \* \*